Jan. 13, 1925.                                                      1,522,627
O. HENKER
DEVICE FOR DETERMINING THE SQUINT DEFLECTION
Filed June 1, 1923

Inventor:
Otto Henker

Patented Jan. 13, 1925.

1,522,627

UNITED STATES PATENT OFFICE.

OTTO HENKER, OF JENA, GERMANY, ASSIGNOR TO THE FIRM OF CARL ZEISS, OF JENA, GERMANY.

DEVICE FOR DETERMINING THE SQUINT DEFLECTION.

Application filed June 1, 1923. Serial No. 642,792.

*To all whom it may concern:*

Be it known that I, OTTO HENKER, a citizen of Germany, and residing at Jena, Germany, have invented new and useful Devices for Determining the Squint Deflection (for which I have filed an application in Germany June 3, 1922), of which the following is a specification.

The present invention relates to apparatus for determining the squint deflection in a pair of eyes, containing a scale and a mark whose position is to be read off on the scale by the patient. If in these devices provision be made that to the one eye of the patient only the scale and to his other eye only the mark will be perceptible, e. g., by rendering the scale and the mark coloured, viz, each of these two parts in a different colour and by placing in front of each eye a corresponding colour filter, the squint deflection sought is obtained from the difference between the true position of the mark relatively to the scale and the position read off by the patient. In the known devices of this kind, on the one hand, the scale and the mark and, on the other hand, means, e. g., eye-piece cups fixing the loci to which the eyes of the patient have to be brought, have been fixed on a common stand and at the same time the scale and the mark have been disposed at approximately the distance of the distinct range of sight from the loci of the eyes. The position of the marks was usually read off by the patient, whilst his eyes were adjusted to the vicinity, viz, to approximately the distinct range of sight. According to the present invention there is disposed between the loci of the eyes on the one hand and between the scale and the mark on the other hand a collective optical system in such a way that the scale and the mark lie in the focal plane of this system, so that each of the eyes of the patient is struck by a pencil of rays parallel to each other. Experience has proved that with this kind of observation, with which the eyes of the patient are in a state of rest and thus not liable to any compulsion, it was possible to attain results which were more faultless and less affected by uncertainties than hitherto. If, in addition, the collective system be so fixed on the stand of the device as to be easily detachable, it will be still further possible to determine in particular cases the squint deflection for that state of the eyes with which they are adjusted to near vision.

Figure 1:
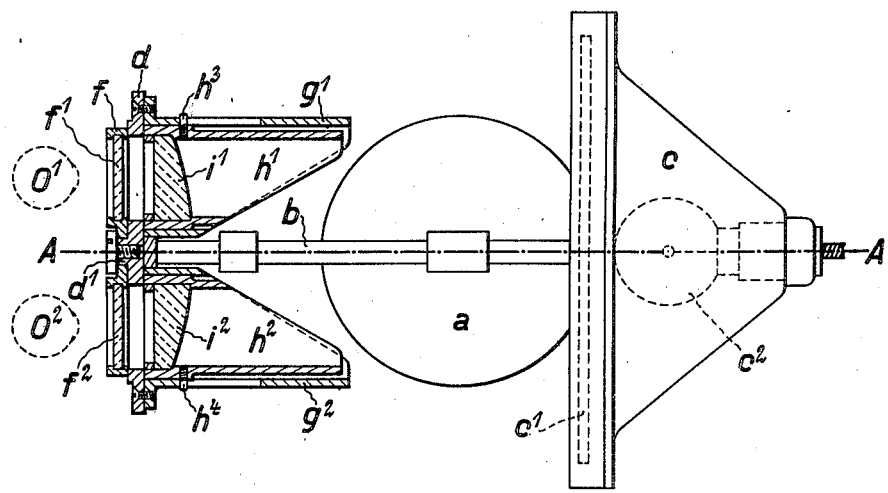
Figure 2:
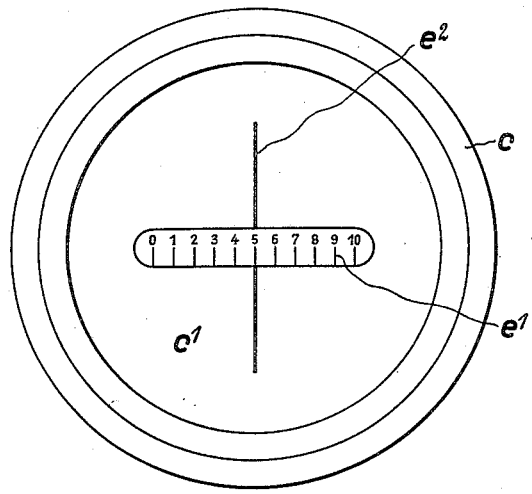

The annexed drawing shows a constructional example according to the invention; Fig. 1 is a plan elevation partly in section and Fig. 2 a view of the part of the device carrying the scale and the mark.

Upon a foot $a$ is fixed a rod $b$ which carries on the one hand a box $c$ and on the other hand a plate $d$. Inside the box, which on its side facing the plate $d$ is closed by a glass plate $c^1$, is disposed an incandescent lamp $c^2$ having a frosted bell. The disc $c^1$ is provided with an opaque coating with the exception of a transparent, green scale $e^1$ and a likewise transparent, red mark $e^2$. The plate $d$ is fitted at its centre with a pivot $d^1$ about which there is rotatable a mount $f$ for two colour filters, a red one $f^1$ and a green one $f^2$. On the other hand there are fixed on the plate $d$ two tubes $g^1$ and $g^2$ into which are inserted two tubes $h^1$ and $h^2$. The two latter form the mounts of two lens parts $i^1$ and $i^2$ which in the requisite position for use (shown in the drawing) of the tubes serve as supplements to a collective lens, the axis of which A—A is perpendicular to the centre of the glass disc $c^1$ and the focal plane of which coincides with the side of the glass disc $c^1$ facing the lens. In order to facilitate the removal of the lenses $i^1$ and $i^2$, they are only fixed by inserting the tubes $h^1$ and $h^2$ into the tubes $g^1$ and $g^2$, whereby their position is secured by pins $h^3$ and $h^4$, fitting into slits of the tubes $g^1$ and $g^2$. The eyes $o^1$ and $o^2$ of the patient are diagrammatically shown in the drawing.

When using the device, the scale $e^1$ and the mark $e^2$ are illuminated by the lamp $c^2$. The mount $f$ is generally so adjusted, that the green colour filter $f^2$ through which the scale is seen, is in front of the more efficient eye of the patient. As a rule, the lenses $i^1$ and $i^2$ are to be used with the device. If, however, the measurement is to be carried out without these lenses, the tubes $h^1$ and $h^2$ must first be pulled out from the tubes $g^1$ and $g^2$.

I claim:

1. Device for determining the squint deflection in a pair of eyes, containing a scale and a mark, means adapted to render visible to the one eye of the patient the scale and to his other eye the mark, and a collective optical system, in the focal plane of which there are disposed the scale and the mark and which affords the view through to both eyes.

2. Device for determining the squint deflection in a pair of eyes, containing a scale and a mark, means adapted to render visible to the one eye of the patient the scale and to his other eye the mark, and a collective optical system, which is so fixed as to be easily detachable and in the focal plane of which there are disposed the scale and the mark and which affords the view through to both eyes.

3. Device for determining the squint deflection in a pair of eyes, containing a scale and a mark which are of different colour, two colour filters disposed side by side, one of these colour filters agreeing respecting its colour with that of the scale and the other of these filters agreeing respecting its colour with that of the mark, and a collective optical system which is disposed in the vicinity of the said colour filters and in the focal plane of which lie the scale and the mark and which affords the view through to both eyes.

4. Device for determining the squint deflection in a pair of eyes, containing a scale and a mark which are of different colour, two colour filters disposed side by side and jointly rotatable about an axis perpendicular to the said scale, one of these two filters agreeing respecting its colour with that of the scale and the other of these filters agreeing respecting its colour with that of the mark, and a collective optical system which is disposed in the vicinity of the said colour filters and in the focal plane of which lie the scale and the mark and which affords the view through to both eyes.

OTTO HENKER.